US012020840B2

(12) United States Patent
Aikawa

(10) Patent No.: US 12,020,840 B2
(45) Date of Patent: Jun. 25, 2024

(54) REACTOR

(71) Applicant: KYOSAN ELECTRIC MFG. CO., LTD., Yokohama (JP)

(72) Inventor: Satoshi Aikawa, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 728 days.

(21) Appl. No.: 17/259,978

(22) PCT Filed: Jul. 17, 2019

(86) PCT No.: PCT/JP2019/028151
§ 371 (c)(1),
(2) Date: Jan. 13, 2021

(87) PCT Pub. No.: WO2020/031644
PCT Pub. Date: Feb. 13, 2020

(65) Prior Publication Data

US 2021/0272735 A1 Sep. 2, 2021

(30) Foreign Application Priority Data

Aug. 6, 2018 (JP) ................................ 2018-147940

(51) Int. Cl.
*H01F 29/14* (2006.01)
*H01F 21/08* (2006.01)
*H01F 27/38* (2006.01)

(52) U.S. Cl.
CPC ............ *H01F 21/08* (2013.01); *H01F 27/38* (2013.01); *H01F 29/14* (2013.01); *H01F 2029/143* (2013.01)

(58) Field of Classification Search
CPC .......... H01F 21/08; H01F 27/38; H01F 29/14; H01F 2029/143

(Continued)

(56) References Cited

U.S. PATENT DOCUMENTS 6,211,749 B1 4/2001 Yuzurihara et al.
6,414,578 B1 * 7/2002 Jitaru ...................... H04B 5/00 336/212

(Continued)

FOREIGN PATENT DOCUMENTS

EP 2535783 A1 12/2012
JP 09129450 A * 5/1997

(Continued)

OTHER PUBLICATIONS

Office Action dated Jun. 23, 2021, issued in counterpart IN Application No. 202137008589, with English translation. (6 pages).

(Continued)

*Primary Examiner* — Shawki S Ismail
*Assistant Examiner* — Joselito S. Baisa
(74) *Attorney, Agent, or Firm* — WHDA, LLP

(57) ABSTRACT

In the reactor in which the wiring board with the main winding formed thereon and the wiring board with the control winding formed thereon are incorporated in layers into the planer core, the magnetic flux generated by the main winding and the magnetic flux generated by the control winding are brought into the following states in order to equalize the density of the magnetic flux generated by the control current. A main winding current of high-frequency current flowing through the main winding generates an AC magnetic fluxes, each of the fluxes having a magnetic field in a direction opposite to each other so as to cancel each other out, and a control current of direct current flowing through the control winding generates a DC magnetic flux with a uniform magnetic flux density around the pair of the inner legs of which AC magnetic fluxes are cancelled out each other.

15 Claims, 12 Drawing Sheets

(58) Field of Classification Search
USPC .................................................. 336/155, 200
See application file for complete search history.

(56) References Cited

U.S. PATENT DOCUMENTS

| | | | | |
|---|---|---|---|---|
| 7,042,323 | B2 * | 5/2006 | Joerg | H01F 19/08 336/212 |
| 7,427,910 | B2 * | 9/2008 | Mehrotra | H01F 27/2804 336/200 |
| 8,120,457 | B2 * | 2/2012 | Hu | H01F 29/14 336/178 |
| 8,896,403 | B2 * | 11/2014 | Beyer | H01F 27/2804 336/173 |
| 10,892,085 | B2 * | 1/2021 | Chin | H01F 27/2804 |
| 2004/0239463 | A1 * | 12/2004 | Poniatowski | H01F 29/14 336/10 |
| 2008/0192960 | A1 * | 8/2008 | Nussbaum | H01F 37/00 381/120 |
| 2017/0047156 | A1 | 2/2017 | Sakamoto et al. | |
| 2019/0237237 | A1 | 8/2019 | Inaba et al. | |

FOREIGN PATENT DOCUMENTS

| | | | |
|---|---|---|---|
| JP | 2003-229315 | A | 8/2003 |
| JP | 2016-15453 | A | 1/2016 |
| JP | 2016-162924 | A | 9/2016 |
| WO | 2001075914 | A1 | 10/2001 |
| WO | 2018/056049 | A1 | 3/2018 |

OTHER PUBLICATIONS

Extended (Supplementary) European Search Report dated Apr. 19, 2022, issued in counterpart EP application No. 19847577.4. (5 pages).

International Search Report dated Sep. 17, 2019, issued in counterpart International Application No. PCT/JP2019/028151 (1 page).

* cited by examiner

REACTOR

TECHNICAL FIELD

The present invention relates to a reactor, in particular to a magnetic flux-controlled reactor that varies an inductance by magnetic flux control.

BACKGROUND ART

An impedance matching device is provided to match an impedance of a high-frequency generator to that of a load during supplying high-frequency power from the high-frequency generator to the load. Conventionally, impedance matching devices comprising a variable capacitance element and a variable inductance element have been known. Impedance matching varies a capacitance value of the variable capacitance element and an inductance value of the variable inductance element.

The impedance matching device handling high power uses a variable capacitor as variable capacitance element and a coil as variable inductance element in such a way that a capacitance value of the variable capacitor is varied by motor drive, and an inductance value of the coil is varied at a contact that slidably contact with the coil by motor drive. In such impedance matching device which varies the impedances automatically, a rate of variation of the capacitance value and the inductance value are dependent on a speed of operation of a motor. Thus, there was a problem with the limitation of time required for the impedance matching.

In regard of the above-mentioned problem rising in an arrangement for automatically varying the impedances, impedance matching devices have been offered for varying the impedance value by using a magnetic flux-controlled reactor. The flux-controlled reactor has configuration that a main winding and a control winding are wound around a core to use as bias flux a DC magnetic flux generated by a direct current flowing the control winding, thereby varying an inductance value of the main winding depending on the magnitude of the direct current flowing the control winding.

FIG. 11(*a*) shows a configuration example of a conventional flux-controlled variable reactor. In a variable reactor 100, main windings 102*a*, 102*b* are wound around two cores 101*a*, 101*b*, respectively, to thereby apply a high-frequency current, and a control winding 103 is wound around the two cores 101*a*, 101*b* such that the cores pass through the control winding, and then a direct current is applied to the control winding. By applying the high-frequency current to the main windings 102*a*, 102*b* to generate a magnetic flux on each portion of the core 101*a*, 101*b* where the cores are adjacent to each other such that the magnetic fluxes respectively have opposing magnetic flux directions, thereby cancelling out the magnetic fluxes on these portions. By applying the direct current to the control winding 103, a DC magnetic flux is formed on the portions of the cores where the AC magnetic fluxes have been cancelled by the high-frequency current. This DC magnetic flux is used to vary inductance values of the main windings 102*a*, 102*b* in order to vary the impedances (see Patent Literature 1).

Furthermore, it has been proposed to use a planer-type transformer instead of a winding-type transformer in an apparatus, such as high-frequency transformer for supplying high-frequency power to an inductance. FIG. 11(*b*) shows a configuration example of a planer-type transformer 110. The planer-type transformer 110 has, for instance, plane cores 111, 112 disposed with protruding portions of E-cores or U-cores opposed to each other. The planer-type EE-core 111 in FIG. 11(*c*) is composed of an E-core 111*a* and an E-core 11*b*, and the planer-type UU-core 112 in FIG. 11(*d*) is composed of U-cores 112*a* to 112*d*. The planer core is configured to hold laminated plane portions of the cores from both sides with cooling fins or cooling plates, so as to increase cooling efficiency against heat generated by the high-frequency. In addition to that, the planer-type transformer realizes a multi-layer by forming a primary winding and a secondary winding with a print substrate having a coil pattern formed thereon (see Patent Literature 2).

CITATION LIST

Patent Literatures

Patent Literature 1: U.S. Pat. No. 6,211,749

Patent Literature 2: Japanese Patent Laid-Open Publication No. 2016-15453

SUMMARY OF INVENTION

Problems to be Solved by the Invention

In a variable reactor to be used in an impedance matching device and similar, a wiring board such as print substrate forming a main winding in a configuration using the planer core protrudes outward from the side of the core. Consequently, the following problems arise:

(i) since a part of the wiring board protrudes outside the core, a footprint of the reactor increases; and (ii) the coil formed on the wiring board protruding outward the core generates a leakage flux.

(i) Problem of the Footprint of the Reactor

FIG. 12 shows a configuration example of a variable reactor 120 in which a planer core 121 and wiring boards 124, 125 are combined, FIG. 12(*a*) showing a schematic configuration, FIG. 12(*b*) showing a main winding substrate 124 on which a main winding 122 is formed, FIG. 12(*c*) showing a control winding substrate 125 on which a control winding 123 is formed.

The planer core 121 comprises a center leg 121*a* disposed on the center of the core, and side legs 121*b*, 121*c* arranged on both sides of the core. The center leg 121*a*, the side legs 121*b*, 121*c* and plain parts form openings for arranging the main winding substrate 124 and the control winding substrate 125 therein. The main winding substrate 124 comprises an opening 126*a* for passing the center leg 121*a*, and opening 126*b* and 126*c* for passing the side legs 121*b* and 121*c*. In addition to that, the control winding substrate 125 comprises an opening 127 for passing the center leg 121*a*.

With respect to a length WA in a lateral direction of the planer core 121, the main winding substrate 124 extends outward from the sides by lengths WB, WC, so that a footprint of the reactor is larger than the area of the planer core 121 by the portions extending outward (lengths WB, WC).

(ii) Problem of the Leakage Flux

On the wiring board extended outside the planer core 121, a part of the main winding is formed. Thus, there is a leakage flux problem that among the fluxes generated by the flow of a high-frequency current through the main winding, the magnetic flux generated around the winding outside the core leaks outside of the reactor.

An object of the present invention is to solve the above problems in the conventional arts and provide a reactor configured by incorporating in layers a wiring board on which a main winding is formed and a wiring board on which a control winding is formed into a planer core in order to decrease a footprint of the reactor. Another object of the invention to prevent a magnetic flux generated by the main winding from leaking outside the reactor.

Means for Solving the Problem

The reactor of the present invention comprises a main winding substrate on which a main winding is formed, a control winding substrate on which a control winding is formed, and a planer core.

The planer core of the reactor of the present invention is an approximate flat plate member formed of a magnetic material, such as ferrite. The flat plate member is composed of two core members divided in the middle of the member, and one surface of each core member has a flat plate shape while the other surface has a protruding portion extending in the direction almost perpendicular to the flat shape. The two core members form a laminated core by arranging their protruding portions to face each other. The planer core of the reactor of the present invention can be configured such that the protruding portions of the E-core or U-core are arranged to face each other. In the planer core, the flat parts on both sides of the core are sandwiched by cooling fins to enhance the cooling effect. Concave parts between the protruding portions provide a through hole in the core. In the through hole, the wiring boards of the main winding substrate and the control winding substrate are disposed.

The reactor of the present invention has the following configuration, in which:

(a) the main winding substrate and the control winding substrate are incorporated in layers into the planer core;

(b) the planer core is provided with a center leg, a pair of inner legs arranged on both sides of the center leg, and a pair of outer legs arranged outside the inner legs;

(c) a main winding current of high-frequency current flowing through the main winding generates an AC magnetic flux around each of the pair of the inner legs, these fluxes having a magnetic field which direction is opposite to each other, to thereby cancel each other; and (d) a control current of a direct current flowing through the control winding generates a DC magnetic flux with a uniform magnetic flux density around all the legs of the core.

The reactor of the present invention solves the above problems (i) and (ii) by means of the above-described configurations as well as providing the following advantages effective to the reactor.

(i) Reduction of Footprint of Reactor

In the reactor of the present invention, the configuration (a) in which the main winding substrate and the control winding substrate are incorporated in layers into the planer core, and the configuration (b) in which the planer core has the center leg, the pair of the inner legs arranged on both sides of the center leg, and the pair of the outer legs arranged outside the inner legs, aims to decrease the footprint of the reactor.

The configuration example of the reactor shown in FIG. 12(*a*) represents a configuration in which a conventional core shown in FIG. 11(*a*) is just replaced with a planer core shown in FIG. 11(*b*). In the configuration example of this planer core, the planer core is additionally placed in a depth direction to increase a magnetic flux without varying an applied current. However, the placement in the depth direction generates a problem of the increase in the footprint of the reactor.

The reactor of the present invention has the configuration in which the planer core has the center leg, the pair of the inner legs arranged on both sides of the center leg, and the pair of the outer legs arranged outside the inner legs, and this configuration has a profile that two planer cores are placed in a lateral direction instead of the depth direction. The lateral placement can be implemented without increasing the number of cores and without causing the increase in the footprint.

In the lateral placement of the planer cores of the present invention, a plane area of a core, which length in the depth direction is half, is equal to the plane area of the planer core of FIG. 12(*a*), thereby enabling to configure the reactor without increasing the footprint of the core.

In addition to configuring the reactor of the invention without increasing the footprint of the core, the main winding substrate and the control winding substrate are incorporated in layers into the planer core, so that it is possible to eliminate the wiring board to be provided on the outside of the core, thereby reducing the footprint of the reactor.

(ii) Prevention of Leakage Flux

In the reactor of the present invention, the above-described configuration (a) that the main winding substrate and the control winding substrate are incorporated in layers into the planer core aims to prevent an occurrence of a leakage flux that a magnetic flux leaks outside the reactor. In addition to that, the reactor of the invention aims to form uniform fluxes and reduce magnetic field noise.

(iii) Formation of Uniform Fluxes

In the magnetic flux generated by the main winding of the above-described configuration (c), the application of a high-frequency current by the main winding induces a high-frequency component in the control winding. The inducement of the high-frequency component causes drawbacks, e.g. the high-frequency current is applied to a control circuit and an excessive voltage is generated in the control winding. In order to avoid such drawbacks, a state of a magnetic flux in which no high-frequency component is induced in the control winding is attained during the production of the magnetic fluxes by the main winding. A uniform flux density can generate a uniform inductance in the main winding wound around each leg so as to be able to vary the inductance of the reactor according to a control current, thereby achieving a state of the magnetic flux of not inducing the high-frequency component.

In the reactor of the present invention configured by incorporating in layers the wiring board on which a main winding is formed and the wiring board on which a control winding is formed into the planer core, the magnetic flux (c) generated by the main winding and the magnetic flux (d) generated by the control winding are brought into the following states to make a magnetic flux generated by the control current to have a uniform magnetic flux density.

In the magnetic flux (d) generated by the control winding, the leg of the core from which the high-frequency component is removed is provided with the control winding. A control current of a direct current flowing through the control winding generates a DC magnetic flux with a uniform magnetic flux density around all the legs, including the pair of the inner legs in which AC magnetic fluxes have been cancelled each other. By making uniform the flux density of the DC magnetic flux generated by the control winding in all legs, the change in the inductance with respect to the main winding can be equalized.

The wiring boards provided to the reactor of the present invention are the main winding substrate and the control winding substrate, and these wiring boards are laminated to configure the reactor. The main winding substrate consists of a first main winding substrate and a second main winding substrate. The control winding substrate is sandwiched from above and below thereof by the first main winding substrate and the second main winding substrate, or may be attached to one of the sides of the layer formed with the first main winding substrate and the second main winding substrate.

The wiring boards provided to the reactor of the present invention are configured to hold the control winding substrate with two main winding substrates to thereby enhancing the degree of bond of the magnetic fields between the main windings and the control winding.

(iv) Reduction of Magnetic Field Noise

The reactor of the present invention induces the high-frequency components in the control winding when the high-frequency current flows through each main winding. However, (c) the main winding current of the high-frequency current flowing through the main winding generates the AC magnetic flux around each of the pair of the inner legs, in which fluxes the direction of the magnetic field is opposite to each other, to thereby cancel the high-frequency components induced in the control winding.

In the inducement in the control winding by the high-frequency currents flowing the two main windings, the high-frequency component induced in the control winding due to the flow of the high-frequency current through one of the main windings and the high-frequency component induced in the control winding due to the flow of the high-frequency current through the other main winding are equal in strength, but these components are opposite in the direction to each other. Thus, the high-frequency components generated by the respective windings cancel each other, so as to remove them.

As a consequence, it prevents the high-frequency current from flowing into the control circuit from the control winding. In addition, since the high-frequency components in the control winding are cancelled, the excessive voltage locally generated in the control winding can be prevented.

Furthermore, since the planer core provided to the reactor of the present invention is configured to (a) accommodate the wiring boards in the through holes formed inside the core, thereby reducing the magnetic field noise caused by the leakage flux. The reduction of the magnetic field noise from the core enables to dispose circuit components and others in the vicinity of the reactor, so that the board density in the entire device can be increased.

The reactor of the present invention has a first embodiment and a second embodiment.

First Embodiment

In the first embodiment of the reactor of the invention, a main winding of a first main winding substrate is configured to surround together a center leg and one of a pair of inner legs, namely a first leg, and a main winding of a second main winding substrate is configured to surround together the center leg and the other of the pair of the inner legs, namely a second leg. In addition to that, a control winding of a control winding substrate is configured to surround the pair of the first inner leg and the second inner leg individually.

Since the main winding of the first main winding substrate has the winding pattern surrounding the center leg and the first inner leg while the main winding of the second main winding substrate has the winding pattern surrounding the center leg and the second inner leg, magnetic fluxes generated around the first inner leg and the second inner leg are cancelled out each other. Furthermore, as the winding of the control winding substrate has the winding pattern surrounding the first inner leg and the second inner leg individually, AC magnetic fluxes around the center leg and the pair of the outer legs are equalized.

According to the first embodiment of the reactor of the present invention, the first main winding substrate and the second main winding substrate can use the common wiring boards, thereby allowing the commonality of components of the reactor to reduce manufacturing costs.

Second Embodiment

In a second embodiment of the reactor of the present invention, a main winding of a first main winding substrate is configured to surround a center leg and a pair of a first inner leg and a second inner leg together, and a main winding of a second main winding substrate is configured to surround the center leg. In addition to that, a control winding of a control winding substrate is configured to surround the pair of the first inner leg and the second inner leg individually.

Since the main winding of the first main winding substrate has the winding pattern surrounding the center leg and the pair of the first inner leg and the second inner leg, while the main winding of the second main winding substrate has the winding pattern surrounding the center leg, AC magnetic fluxes generated around the first inner leg and the second inner leg are cancelled out each other.

Furthermore, as the winding of the control winding substrate has the winding pattern surrounding the pair of the first inner leg and the second inner leg individually, magnetic flux densities around all the legs including the center leg and the first and second inner legs are equalized.

According to the second embodiment of the reactor of the present invention, the winding pattern of the second main winding substrate is formed to surround the center leg, so that the areas of the wiring boards can be decreased.

In the first embodiment and the second embodiment, the AC magnetic fluxes around the first inner leg and the second inner leg respectively have the magnetic fields in the direction opposite to each other.

In the reactor of the present invention, the control current may be variable or fixed. By making the control current to be variable, a magnetic flux-controlled variable inductance can be formed. By making the control current to be fixed, a magnetic flux-controlled fixed inductance can be formed. The magnetic flux-controlled fixed inductance can adjust the control current to set an inductance value of the fixed inductance to a predefined value.

Effects of the Invention

In accordance with the reactor of the present invention, the configuration that the wiring board, on which the main winding is formed, and the wiring board, on which the control winding is formed, are incorporated in layers into the planer core can decrease the footprint of the reactor. In addition to that, the reactor can prevent the leakage flux which is a leakage of the magnetic flux generated by the main winding from the reactor.

BEST MODE FOR CARRYING OUT THE INVENTION

Figure 4:
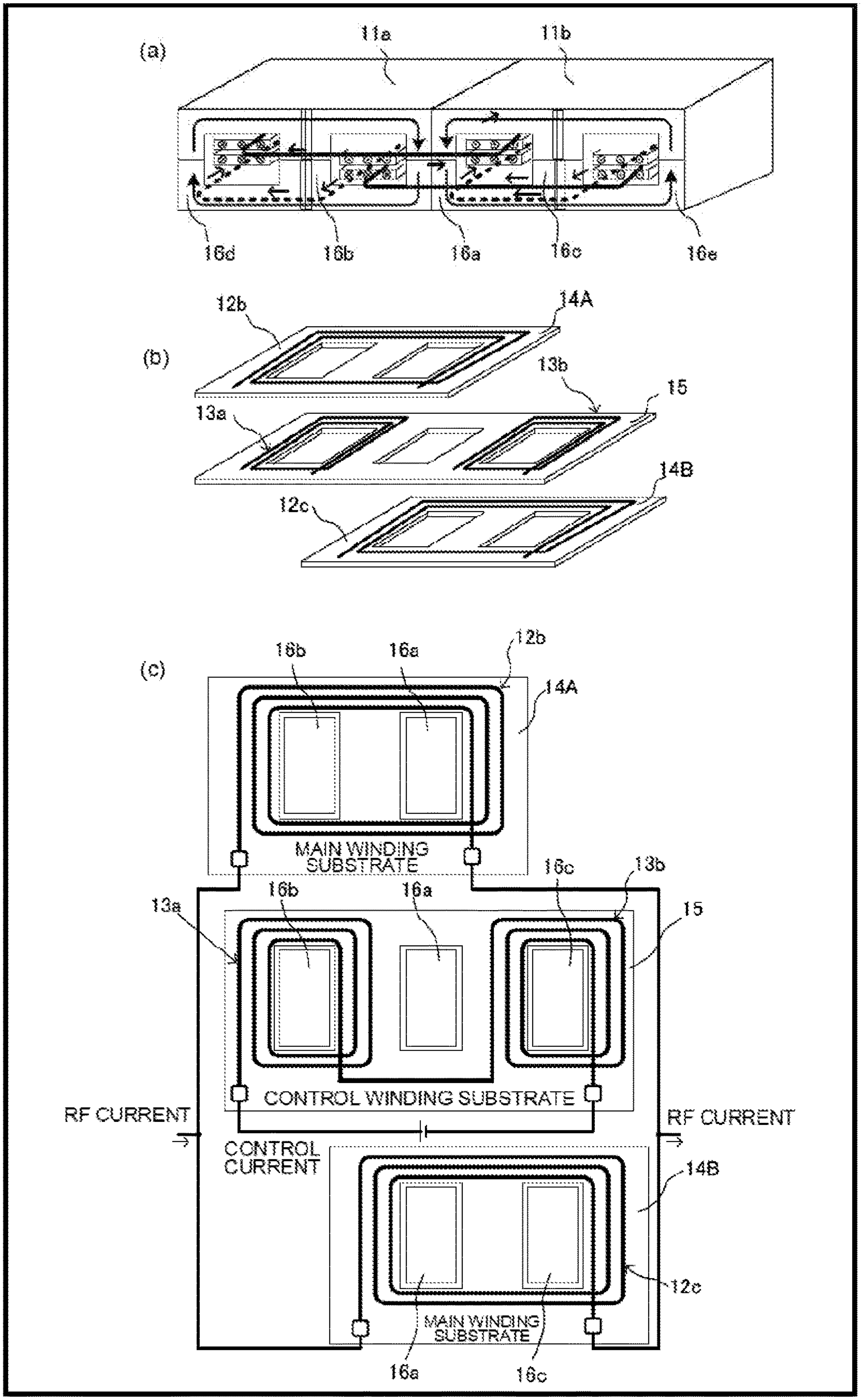
FIG. 4 is a diagram illustrating a first embodiment of the reactor according to the present invention.
Figure 5:
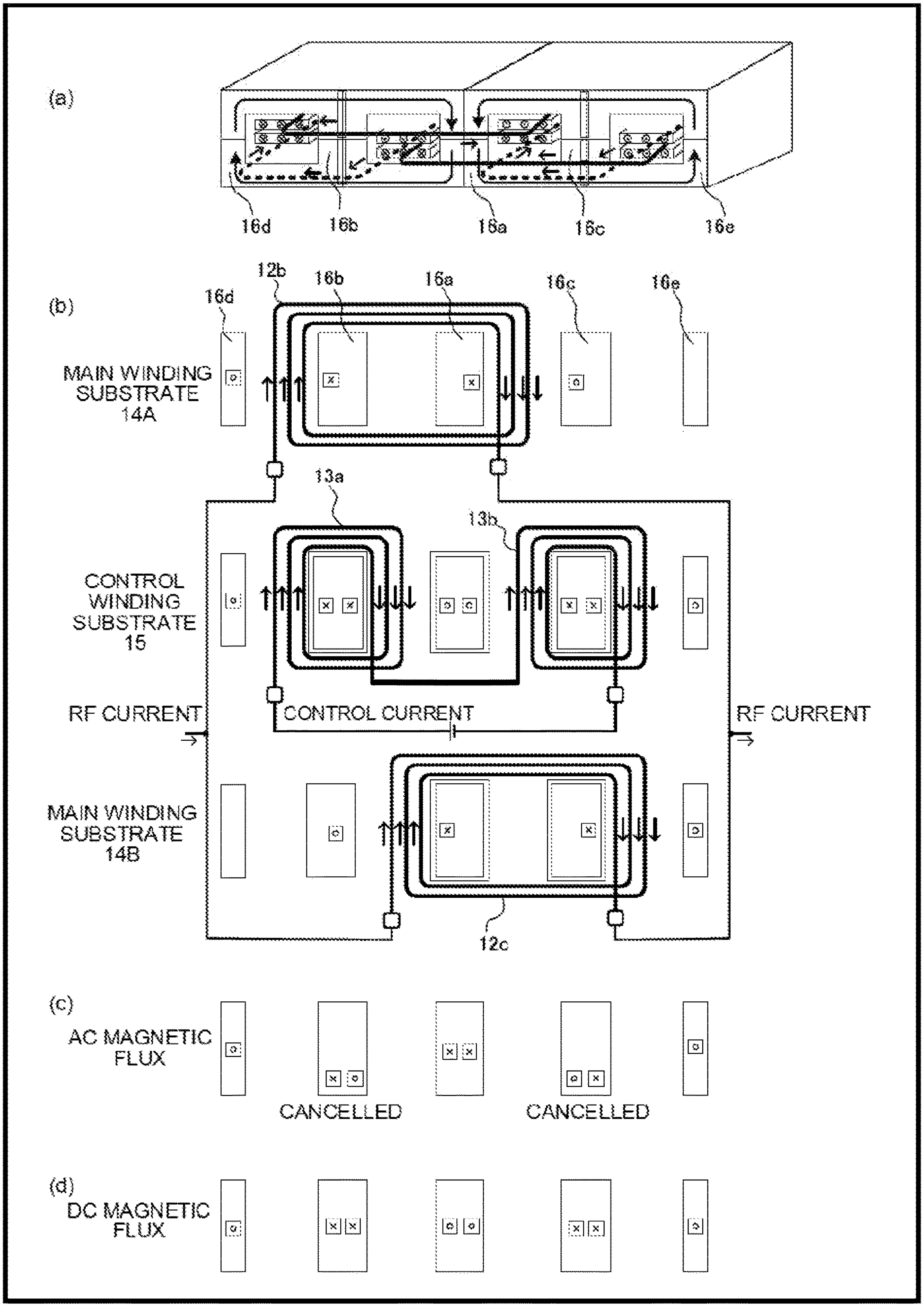
FIG. 5 is a diagram illustrating a state of each current and a state of each magnetic flux in the first embodiment of the reactor according to the present invention.
Figure 6:
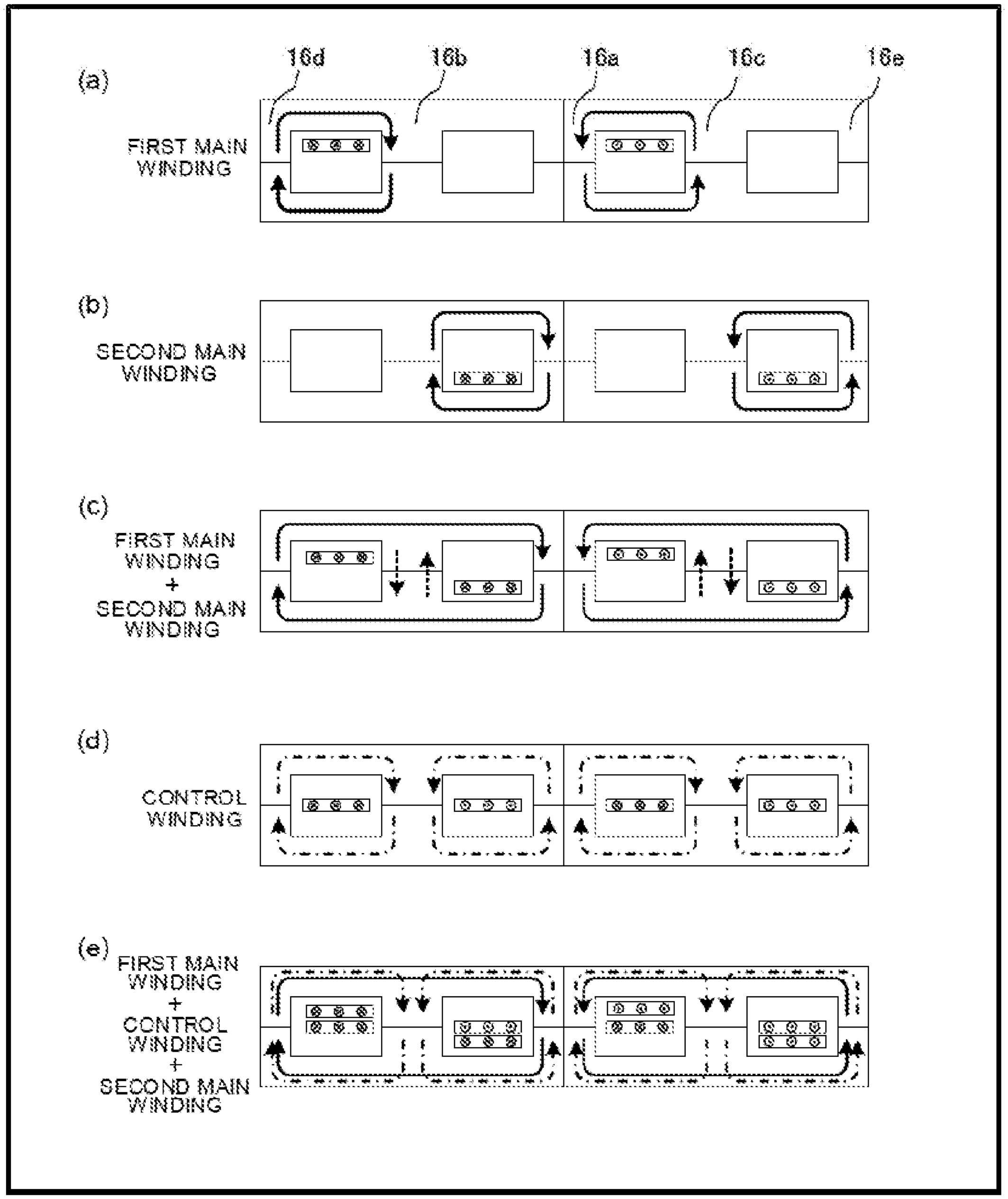
FIG. 6 is a diagram illustrating another state of each current and another state of each magnetic flux in the first embodiment of the reactor according to the present invention.
Figure 7:
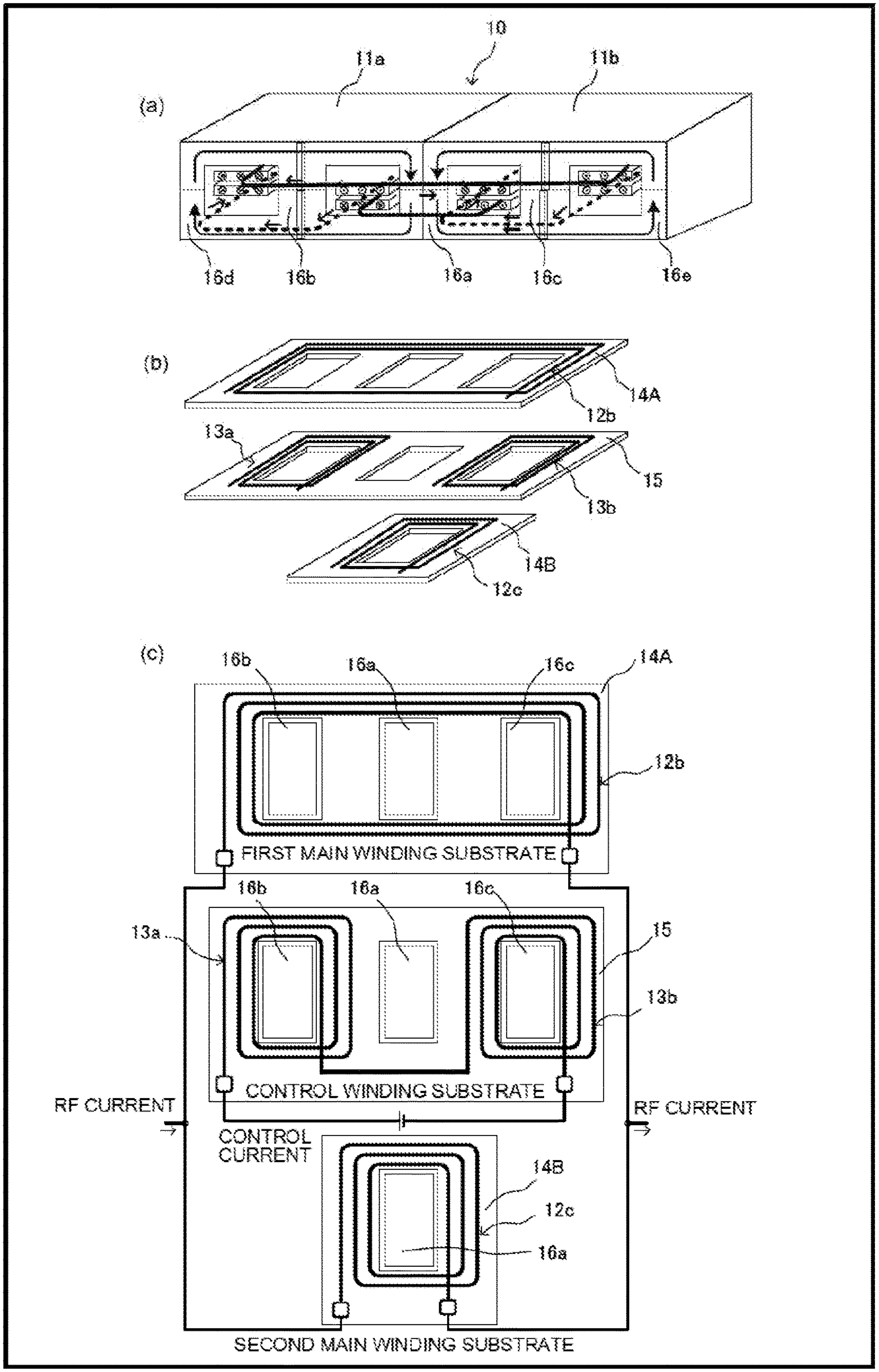
FIG. 7 is a diagram illustrating a second embodiment of the reactor according to the present invention.
Figure 8:
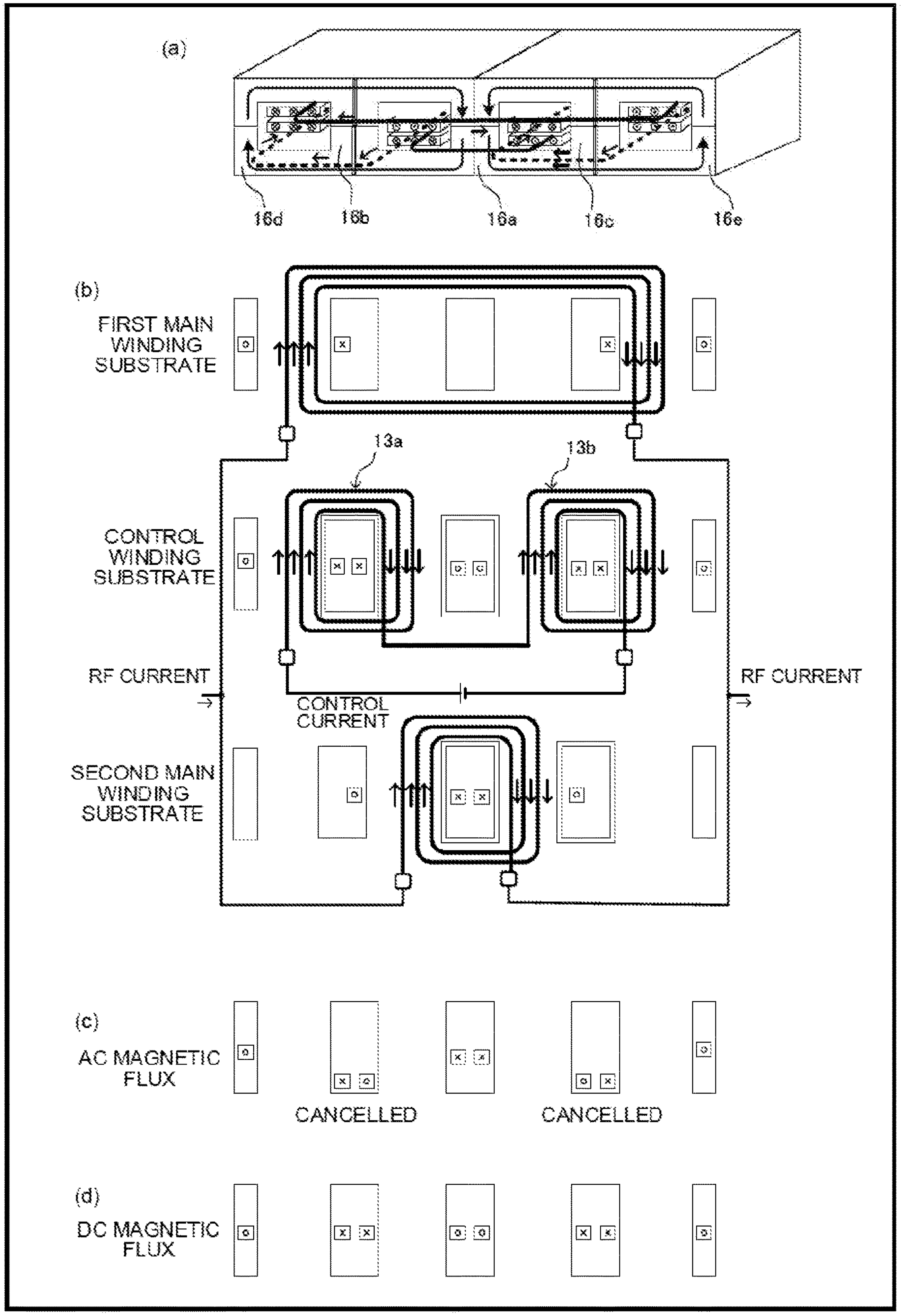
FIG. 8 is a diagram illustrating a state of each current and a state of each magnetic flux in the second embodiment of the reactor according to the present invention.
Figure 9:
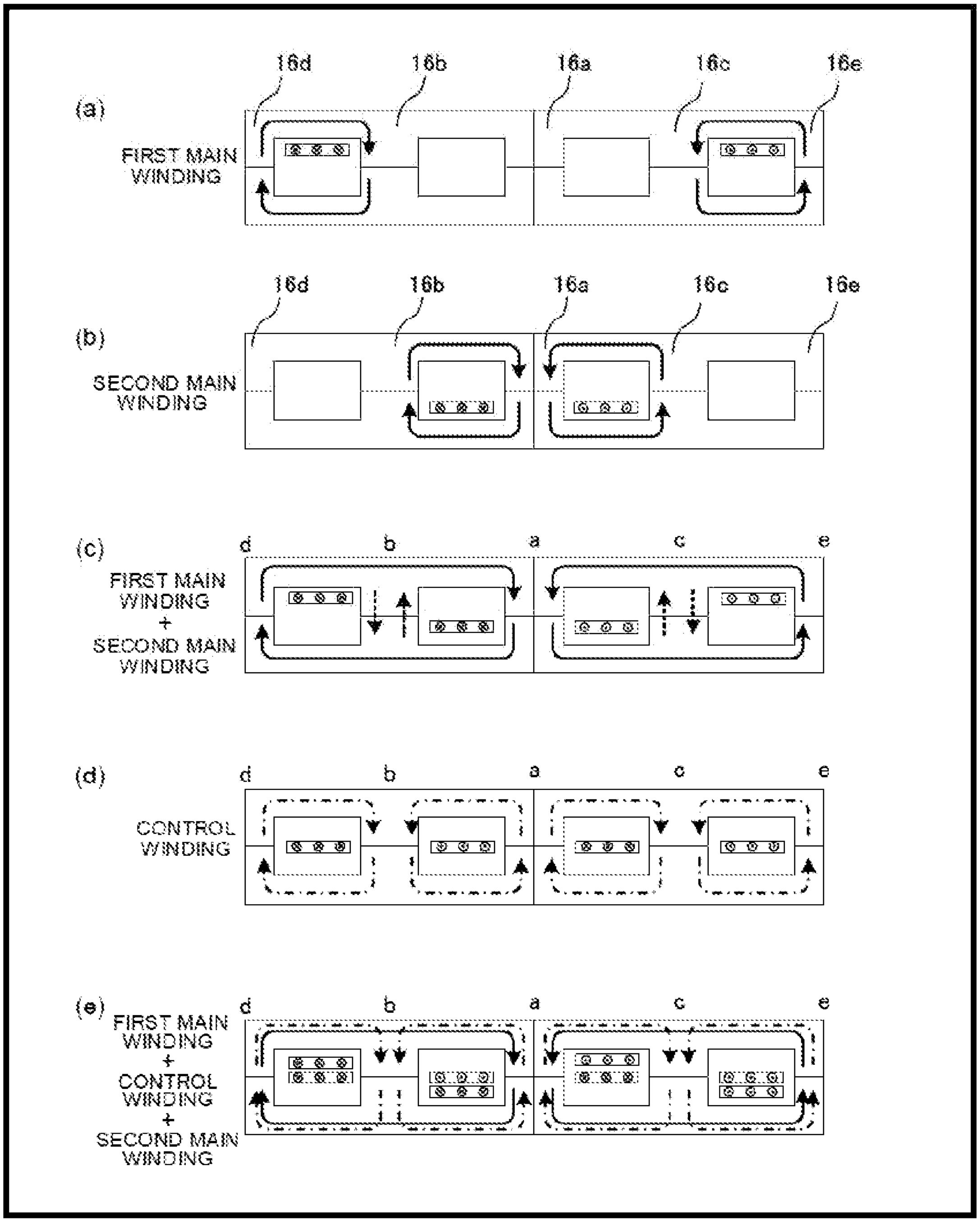
FIG. 9 is a diagram illustrating another state of each current and another state of each magnetic flux in the second embodiment of the reactor according to the present invention.
Figure 10:
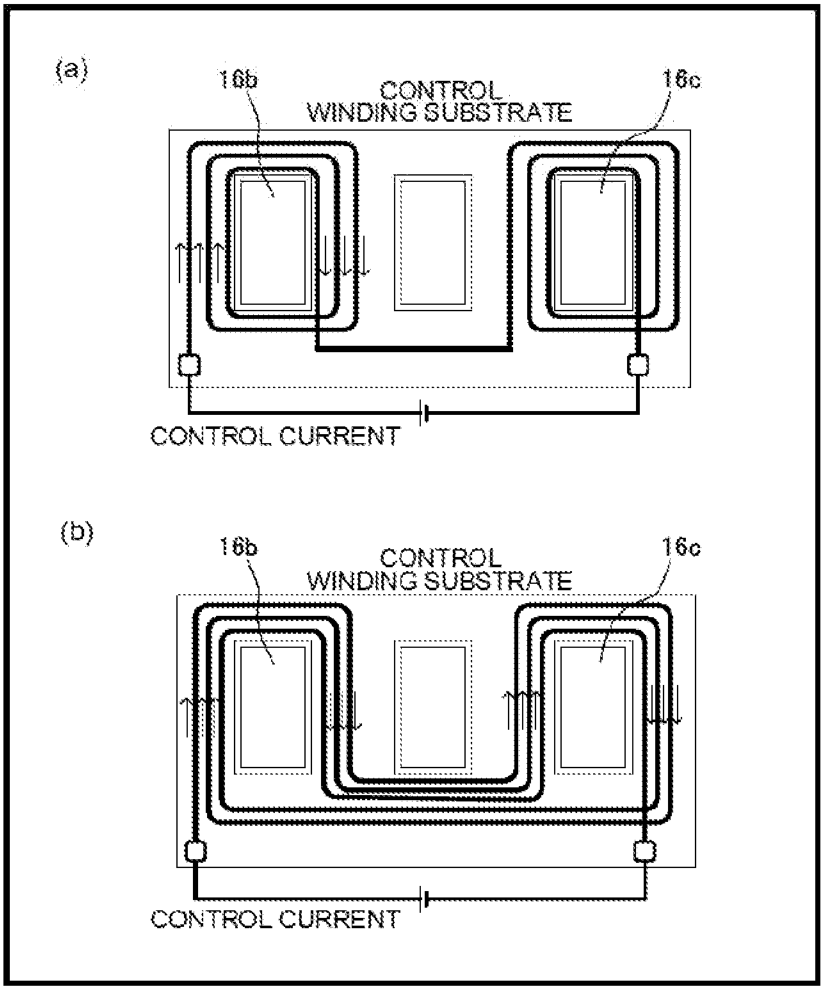
FIG. 10 is a diagram illustrating other examples of the winding pattern of a control winding of the reactor according to the present invention.
Figure 11:
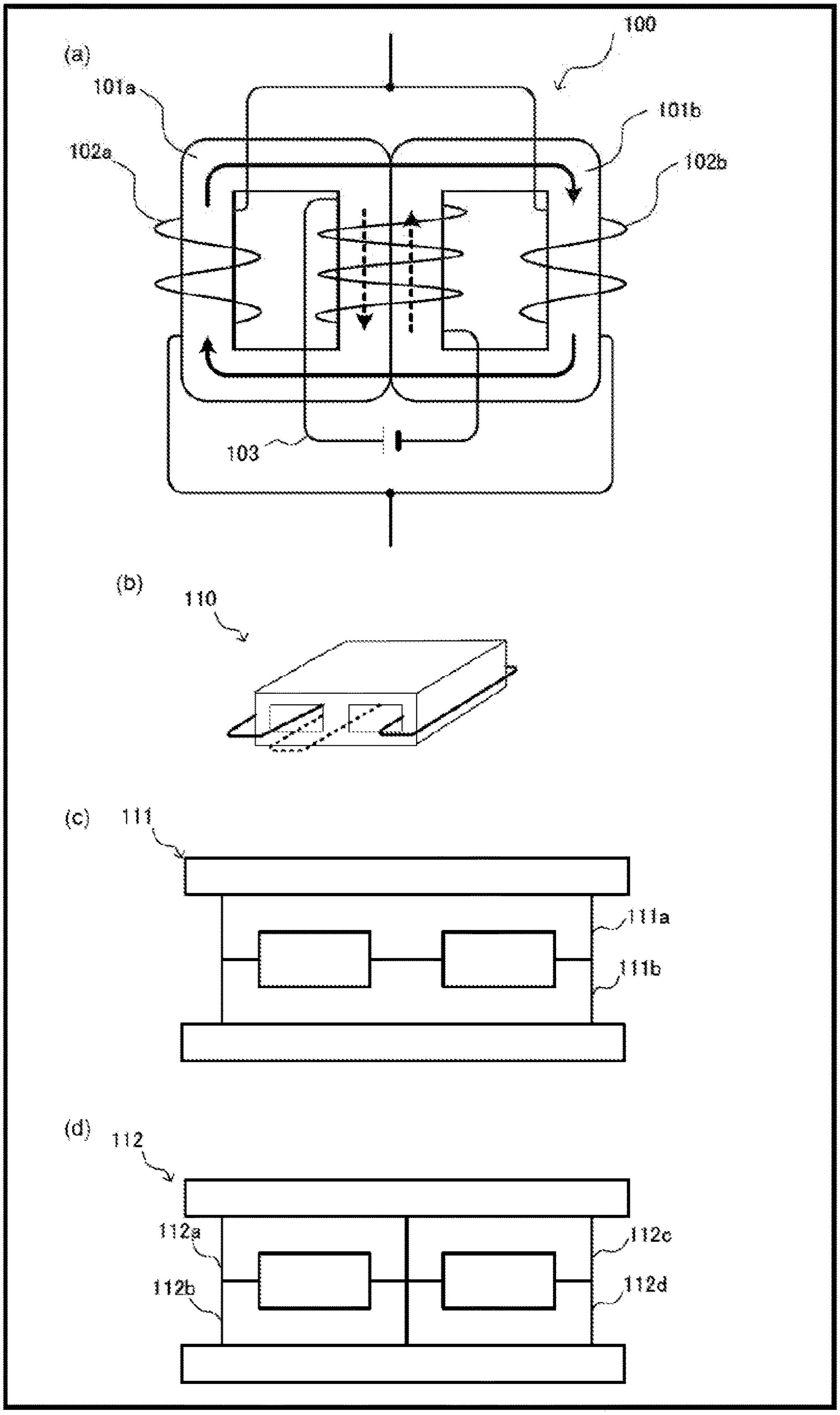
FIG. 11 is a diagram showing a configuration example of a conventional variable reactor.

A reactor according to the present invention will be described with reference to the accompanying drawings. Now, FIG. 1 will be used to illustrate a schematic configuration of the reactor according to the present invention, FIG. 2 will be used to illustrate a decrease in a footprint of the reactor, and FIG. 3 will be used to illustrate uniform fluxes. Furthermore, FIGS. 4 to 6 are used to illustrate a first embodiment of the reactor according to the present invention, FIGS. 7 to 9 are used to illustrate a second embodiment of the reactor according to the present invention, and FIG. 10 is used to illustrate different examples of a winding pattern of a control winding.

(Schematic Configuration of the Reactor According to the Present Invention)

Figure 1:
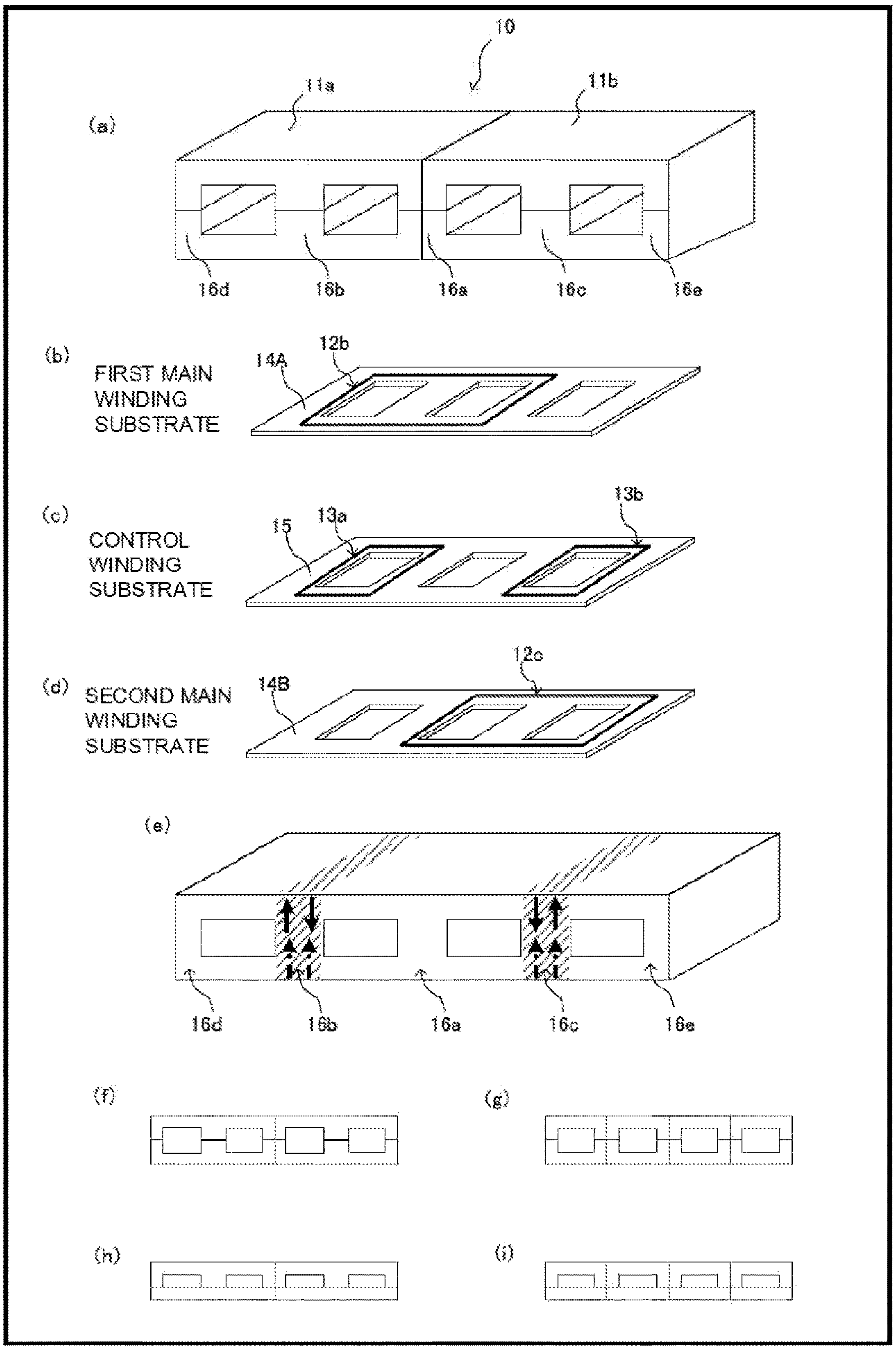
FIG. 1 is a diagram illustrating a schematic configuration of a reactor according to the present invention.

A description will be made about a schematic configuration of the reactor of the present invention by referring to FIG. 1. FIG. 1(*a*) shows a schematic shape of a planer core provided to the reactor, and FIGS. 1(*b*), 1(*c*) and 1(*d*) respectively show a first winding substrate, a control winding substrate and a second winding substrate of the reactor of the present invention. FIG. 1(*e*) schematically shows a state of a magnetic flux generated in the core by each winding.

In FIG. 1(*a*), a planer core 11 of a reactor 10 is an approximately flat-shaped member formed with a magnetic material such as ferrite, which is composed of two core members divided on a central plane. One surface of each core member has a plane shape, and the other surface has a protruding portion extending toward a direction approximately perpendicular to the plane shape, the protruding portion forming a leg of the core.

By placing opposite the protruding portions of respective two core members, a laminated core is formed. A concave part between the protruding portions forms a through hole inside the core. In the through hole, wiring boards for a first main winding substrate 14A, a second main winding substrate 14B and a control winding substrate 15 are arranged.

The planer core 11 shown in FIG. 1(*a*) employs four E-cores as core members. FIG. 1(*a*) shows a configuration example having two planer cores 11*a*, 11*b* which are formed in such a manner that the protruding portions of two E-cores are arranged to oppose to each other. The configuration example represents an EE-core employing the E-cores in this description, but may represent a UU-core employing eight U-cores.

The planer core 11 has a center leg 16*a*, a pair of inner legs 16*b*, 16*c* arranged on both sides of the center leg 16*a*, and a pair of outer legs 16*d*, 16*e* further arranged outside the inner legs 16*b*, 16*c*, and the wiring boards are disposed in the through holes between the adjacent legs.

The wiring board of the first main winding substrate 14A shown in FIG. 1(*b*) is provided with a winding pattern of the first main winding 12*b*, and the wiring board of the second main winding substrate 14B show in FIG. 1(*d*) is provided with a winding pattern of the second main winding 12*c*. In addition to that, the wiring board of the control winding substrate 15 shown in FIG. 1(*c*) is provided with winding patterns of the control windings 13*a*, 13*b*.

The first main winding substrate 14A, the second main winding substrate 14B and the control winding substrate 15 are provided with openings, into which the respective legs of the planer core 11 are inserted, thereby incorporating the wiring boards in layers in the planer core 11. The wiring boards shown in FIGS. 1(*b*), 1(*c*) and 1(*d*) have the configurations corresponding to a first embodiment of the reactor of the present invention.

The planer core 11 shown in FIG. 1(*e*) schematically presents the state of magnetic flux generated by a winding current flowing through each winding.

The planer core 11 is provided with the outer leg 16*d*, the inner leg 16*b* and the center leg 16*a*, the inner leg 16*c* and the outer leg 16*e* sequentially from one side of the core, and a magnetic flux with an AC magnetic field is generated by a high-frequency current flowing through the main windings 12*b*, 12*c* whereas a magnetic flux with a DC magnetic field is generated by a direct current flowing the control winding 13.

According to the reactor of the present invention, in the inner leg 16*b* and the inner leg 16*c*, the high-frequency current is applied to the windings of the respective main windings 12*b*, 12*c* so as to induce high-frequency components in the control winding. However, as a magnetic field is formed in each inner leg in the direction opposite to each other, the high-frequency components induced in the control winding are cancelled.

The winding pattern of the control winding 13 (13*a*, 13*b*) is provided to surround the inner legs 16*b*, 16*c*, so that the magnetic flux can be generated by the DC magnetic field on all the legs. The magnetic fluxes generated on all the legs can be equalized by supplying control currents at an equal current value to the control winding 13 (13*a*, 13*b*).

The planer core 11 can be configured by combining the E-core of an E-shaped cross-section that has three protruding portions on its one side, the U-core of a U-shaped cross-section that has two protruding portions on its one side, and an I-core of I-shaped cross-section that has no protruding portions.

In the configuration example of FIG. 1(*f*), the protruding portions of two E-cores are arranged to face each other so as to configure the EE-core, and two EE-cores are arranged in the lateral direction to configure the planer core 11.

In the configuration example of FIG. 1(*g*), the protruding portions of two U-cores are arranged to face each other so as to configure the UU-core, and four UU-cores are arranged in the lateral direction to configure the planer core 11.

In the configuration example of FIG. 1(*h*), the I-core is placed to the protruding portion of one E-core to configure an EI-core, and two EI-cores are arranged in the lateral direction to configure the planer core 11.

In the configuration example of FIG. 1(*i*), the I-core is placed to the protruding portion of one U-core to configure a UI-core, and four UI-cores are arranged in the lateral direction to configure the planer core 11.

(i) Footprint of Reactor

The reactor of the present invention has a profile that two planer cores being arranged in the lateral direction, and now a description will be made about a suppression of a footprint of the core part of the reactor by the above lateral arrangement, by referring to FIG. 2. The lateral arrangement of the planer core is constituted by the legs provided to the reactor of the invention, namely, the center leg, the pair of inner legs arranged on both sides of the center leg, and the pair of outer legs arranged outside the inner legs.

Figure 2:
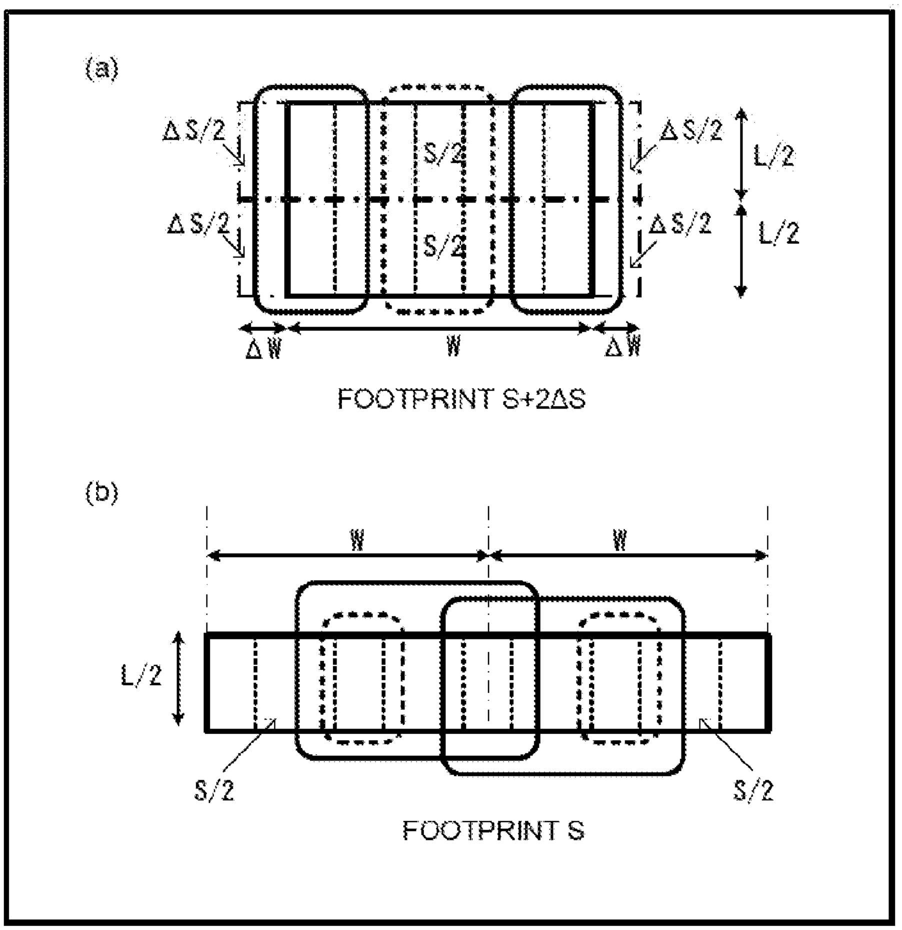
FIG. 2 is a diagram illustrating a decrease in a footprint of the reactor according to the present invention.
Figure 12:
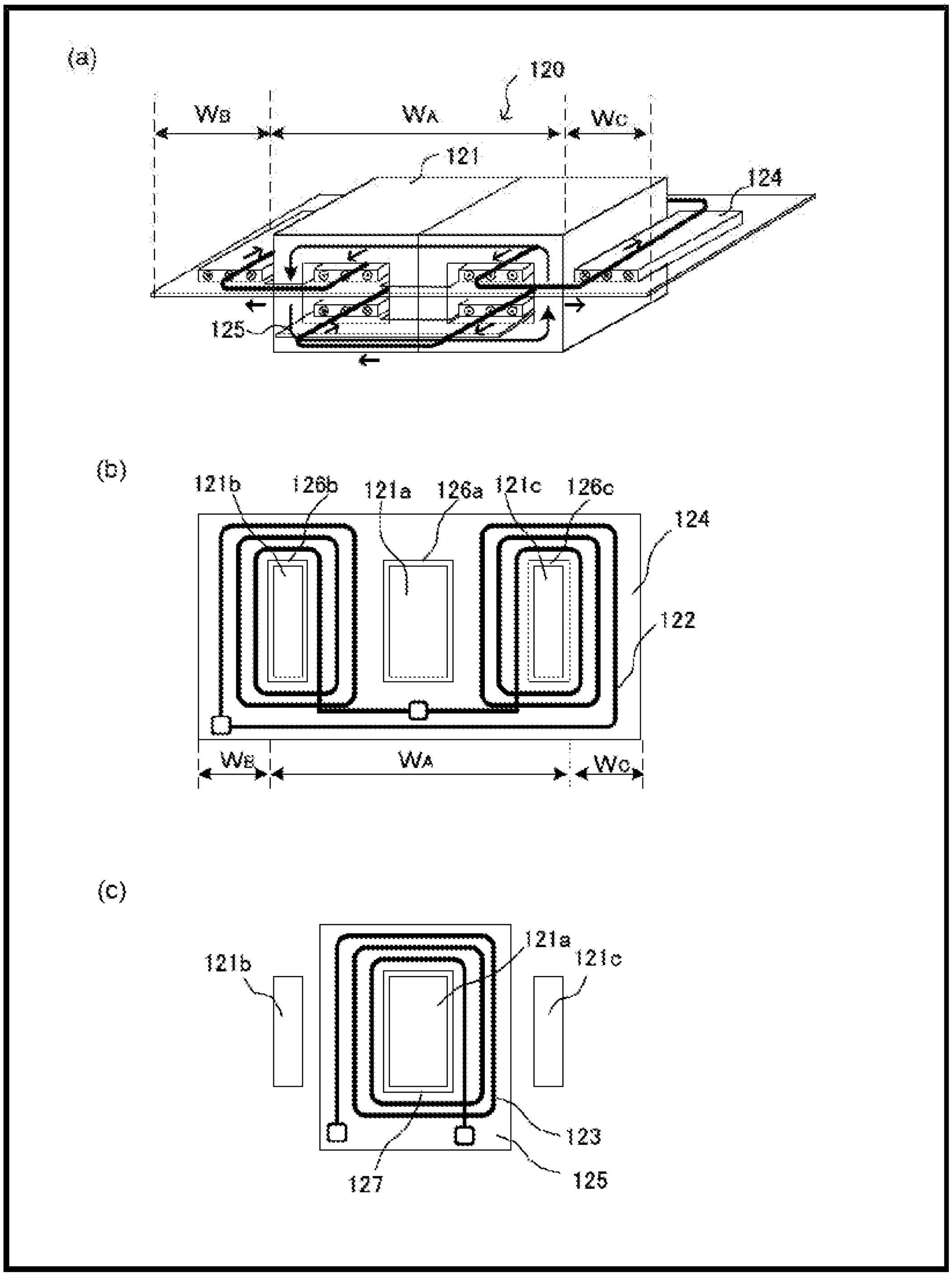
FIG. 12 is a diagram illustrating a configuration example of a reactor with a combination of a planer core and wiring boards.

FIG. 2 is a diagram illustrating the decrease in the footprint by the reactor of the present invention. FIG. 2(*a*) shows a configuration by adopting the wiring board of the planer core, which is the example shown in FIG. 12. A width of the core in the lateral direction is denoted by W and a length of the core in the width direction is denoted by L. The wiring board extends by DW from the side of the core. Since the extending areas of the wiring board (the ground pattern in the figure) on both sides with respect to the plane area S of the core are respectively ΔS, the footprint due to the planer core in FIG. 2(*a*) is (S+2ΔS).

FIG. 2(*b*) shows a configuration of the reactor of the present invention. The reactor of the invention has a shape corresponding to the configuration of FIG. 2(*a*) in which the planer core is divided into halves in its depth and disposed in the lateral direction. In view of the arrangement form of the core, the configuration of the reactor of the present invention corresponds to a widthwise arrangement while the configuration of the conventional reactor corresponds to a lengthwise arrangement. The configuration of FIG. 2(*b*) has the length of L/2 in the width direction in order to make comparison with the plane area of the core of the configuration in FIG. 2(*a*), thereby achieving a configuration according to the plane area S of the planer core in FIG. 2(*a*).

In comparison of the plane area of the core of the reactor of the present invention in FIG. 2(*b*) and the plane area of the core with the configuration in FIG. 2(*a*), the footprint of the core with the configuration in FIG. 2(*a*) is presented as (S+2ΔS) which is the sum of the plane area S of the core and the protruding part 2ΔS. In contrast, the footprint of the reactor of the present invention does not include the protruding part 2ΔS, and is therefore presented only with the plane area S of the core. In this way, in comparison of the footprints, the footprint of the reactor of the invention is S, whereas the footprint of the lateral arrangement configuration of the planer core is (S+2ΔS). Thus, the footprint in the reactor of the present invention is decreased by 2ΔS.

Consequently, the reactor of the present invention can be configured without increasing the number of the cores, thereby avoiding the increase in the footprint of the reactor, compared to the case of lengthwise arrangement of the planer core having the footprint that includes the plane area of the core.

Moreover, the planer core of the reactor of the present invention is configured to accommodate the wiring boards in the through holes provided inside the core, thereby decreasing magnetic field noise caused by a leakage flux. The reduction of the magnetic field noise from the core makes it possible to dispose circuit components and others adjacent to the reactor, and thus a packing density in the device can be increased in its entirety.

(ii) Suppression of Leakage Flux

In the reactor of the present invention, the main winding substrates and the control winding substrate are incorporated in layers in the planer core, so as to prevent the occurrence of a leakage flux which is a magnetic flux leaking from the reactor.

(iii) Elimination of Non-uniform Magnetic Flux

As means for eliminating the leakage flux from the winding on the outside of the core, a side part of the planer core may be extended in the lateral direction to fit the coil of the main winding in the core. However, the configuration in which the side part of the planer core is merely extended in the lateral direction to form the core has a problem that a magnetic path of the magnetic flux passing through the core causes the non-uniformity of the magnetic flux which leads to the non-uniformity of the inductance, and thus the reactor cannot work as flux-controlled type reactor.

In order to work as the magnetic flux-controlled type reactor, it is required that the inductance in the magnetic path in the core is uniform. For the uniformity of the inductance, it is necessary that the magnetic flux densities of the AC magnetic flux and the DC magnetic flux are equal in a main magnetic path. It is also necessary that a magnetic path where the AC magnetic flux passes is applied with the DC magnetic flux as bias magnetic flux by the control current.

A description will now be made about the non-uniformity in the magnetic flux densities of the AC magnetic flux and the DC magnetic flux, and about the non-uniformity in the bias magnetic flux due to the DC magnetic flux in the configuration example.

(Non-uniformity in Magnetic Flux Density of AC Magnetic Flux)

Figure 3:
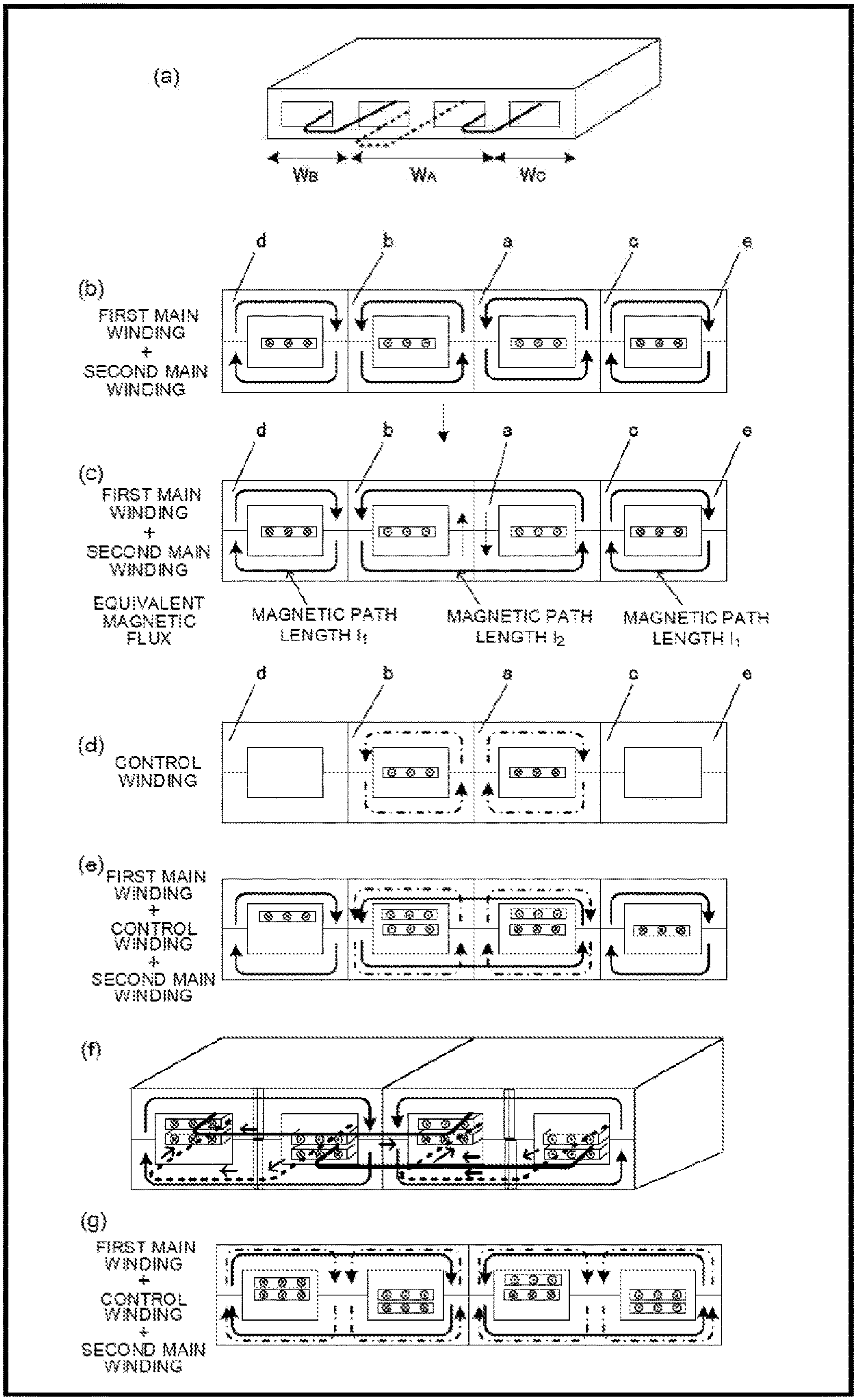
FIG. 3 is a diagram illustrating a conceivable configuration example of the reactor by means of a planer core.

FIG. 3 shows a conceivable configuration example of the reactor with the planer core. In the schematic configuration in FIG. 3(*a*), the planer core extends both sides by the lengths of WB and WC to place the main windings, shown with the solid lines, in the core. The broken line in FIG. 3(*a*) depicts the coil of the control winding. FIGS. 3(*b*) and 3(*c*) show the states of the AC magnetic fluxes generated by the main windings.

FIG. 3(*b*) shows the states of the AC magnetic fluxes generated by the main windings, and FIG. 3(*c*) shows the states of the equivalent magnetic fluxes. The core has a center leg a, inner legs b and c. The first main windings and the second winding are wound around the inner legs b and c respectively. The arrows in FIGS. 3(*b*) and 3(*c*) present examples of the AC magnetic fluxes generated by the alternating current flowing through the main windings. Since the magnetic fluxes around the center leg a have the magnetic flux directions opposite to each other depending on the first main winding and the second main winding, these fluxes balance out each other and are cancelled out. As shown in the state of the equivalent magnetic flux in FIG. 3(*c*), the magnetic fluxes around the center leg a are cancelled out, thereby forming magnetic paths for the AC magnetic fluxes, namely a magnetic path passing the outer leg d and the inner leg b, a magnetic path passing the inner legs b and c, and a magnetic path passing the inner leg c and the outer leg e. Of these magnetic paths, the outer magnetic path has the path length of $1_1$ while the inner magnetic path has the path length of $1_2$, and the path length $1_2$ is longer than the path length $1_1$. A magnetic flux density B can be expressed as B=μ*N*I/1, where μ is a magnetic flux coefficient, N is the number of turns of the coil, I is a current and 1 is the path length, and an inductance L of each magnetic path is expressed as L=μ*S*$N^2$/1, where S is a cross-sectional area and N is the number of turns of the winding. These relational expressions for the magnetic flux density B and the inductance L show that the magnetic flux densities B and the inductances L of the magnetic paths having different path lengths 1 differ from one another.

In this way, the reactor having the configuration shown in FIG. 3(*a*) causes the non-uniformity in the magnetic flux density of the AC magnetic fluxes and the inductances in the magnetic paths.

(Non-uniformity in Bias Magnetic Flux by DC Magnetic Flux)

FIG. 3(*d*) shows a state of the DC magnetic flux generated by the control windings. The control windings are wound around the center leg a to apply the direct current to the control windings, so that magnetic fluxes are generated on the magnetic path passing the inner leg b and the center leg a and the magnetic path passing the inner leg c and the center leg a. Since two magnetic fluxes flow through the center leg a, the magnetic flux density through the center leg a gets higher than that through each of the inner leg b and the inner leg c. Consequently, in the reactor with the configuration of FIG. 3(*a*), the magnetic flux density of the bias magnetic flux generated in each magnetic path becomes non-uniform.

FIG. 3(*e*) shows a state of a magnetic flux obtained by combining magnetic fluxes of the main windings and a magnetic flux of the control winding. Since no DC magnetic flux is generated on the outer legs d and e by the control windings, a magnetic path, in which the bias magnetic flux is not applied to the AC magnetic flux generated by the main magnetic flux, is formed.

On the other hand, FIGS. 3(*f*) and 3(*g*) respectively show the configurations of the reactor of the present invention and the states of the magnetic fluxes thereof. FIG. 3(*f*) shows the schematic configuration of the reactor of the invention, in which the wiring boards of the main windings and the wiring board of the control winding are disposed inside the core of the reactor. FIG. 3(*g*) shows the state of a magnetic flux obtained by combining magnetic fluxes of the main windings and a magnetic flux of the control winding generated by the reactor of the present invention. The DC magnetic flux is also generated on the outer legs d and e by the control winding so as to apply the bias magnetic flux to all AC magnetic fluxes formed by the main magnetic flux. Consequently, in the reactor having the planer core to which the wiring boards are incorporated in layers, the densities of the magnetic fluxes generated by the control current of the control winding become uniform, while the inductance of the reactor is set according to the control current of the current winding.

In the reactor according to the present invention that is configured by incorporating in layers the wiring boards respectively having the main winding formed thereon and the wiring board having the control winding formed thereon into the planer core, (a) the magnetic fluxes generated by the main windings and (b) the magnetic flux generated by the control winding are respectively made to be in the following states, so as to enable to make a uniform magnetic flux densities by the control current uniform.

(a) When a high-frequency current is applied to the main windings, a high-frequency component is induced in the control winding, and the inducement of the high-frequency component causes a drawback that the high-frequency current is applied to a control circuit, and a drawback that an excessive voltage is generated across the control winding. In order to prevent these drawbacks, the magnetic fluxes are brought to the state in which the high-frequency component is not induced in the control winding during the production of the magnetic fluxes by the main windings.

(b) The control winding is formed around the legs of the core from which the high-frequency component is removed.

The uniform magnetic flux density can generate uniform inductances on the main windings that are wound around the legs, thereby enabling to vary inductances in the reactor depending on the control current. Main winding currents of the high-frequency current flowing the main windings generates AC magnetic fluxes of which magnetic field directions are opposite to each other in a pair of the inner legs, and then the magnetic fluxes cancel each other out.

That is to say, in the inducement of the high-frequency component in the control winding by the high-frequency currents of two main windings, the high-frequency component induced in the control winding due to the flow of the high-frequency current of one of the main windings and the high-frequency component induced in the control winding due to the flow of the high-frequency current in the other main winding are the same in strength, but these components are in the direction opposite to each other. Consequently, the high-frequency components generated by the respective windings cancel each other, so as to remove them.

Although the high-frequency components are induced in the control winding due to the flow of the high-frequency currents in each main winding, the generation of the magnetic fields in opposite directions on the legs can cancel the high-frequency components induced in the control winding.

As a result, it can prevent the high-frequency current from flowing into the control circuit from the control winding. In addition to that, the cancellation of the high-frequency component of the control winding can suppress the local generation of the excessive voltage across the control winding.

The control current of the direct current flowing the control winding generates the DC magnetic flux with the uniform magnetic flux density around all the legs including the pair of the inner legs in which the AC magnetic fluxes have been cancelled out. By making the magnetic flux density of the DC magnetic flux generated by the control winding uniform in all the legs of the core, it is possible to equalize the variation of the inductances with respect to the main windings.

The wiring boards provided to the reactor of the present invention are the main winding substrates and the control winding substrate, which are stacked on top of each other. The main winding substrate consists of the first main winding substrate and the second main winding substrate. The control winding substrate may be sandwiched from above and below thereof by the first main winding substrate and the second main winding substrate, or may be disposed on either side of the layer of the first main winding substrate and the second main winding substrate.

The wiring board provided to the reactor of the present invention is configured by sandwiching the control winding substrate with two main winding substrates to thereby enhance the degree of bond of the magnetic fields between the main windings and the control winding.

First Embodiment of Reactor

With reference to FIGS. 4 to 6, a first embodiment of the reactor according the present invention will be described.

FIG. 4 shows a schematic diagram of the first embodiment of the reactor of the invention. In this figure, the same reference signs are assigned to the parts in common with those in FIG. 1.

FIG. 4(*a*) shows a schematic configuration of the planer core 11 of the reactor 10. This planer core 11 has the same configuration as that in FIG. 1(*a*) and employs four E-cores as core members, in which the protruding portions of two E-cores are arranged facing each other so as to form two planer cores 11*a*, 11*b*. Although FIG. 4(*a*) shows a configuration of an EE-core employing the E-cores, this configuration may be a UU-core employing the U-cores.

The planer core 11 comprises the center leg 16*a*, a pair of inner legs 16*b*, 16*c* arranged on both sides of the center leg 16*a*, and a pair of outer legs 16*d*, 16*e* further arranged outside the inner legs 16*b*, 16*c*. Through holes are formed between the adjacent legs, into which the wiring boards of the first main winding substrate 14A, the second main winding substrate 14B and the control winding substrate 15 are arranged.

FIG. 4(*b*) shows the wiring boards of the first main winding substrate 14A, the second main winding substrate 14B and the control winding substrate 15. FIG. 4(*c*) shows the winding patterns respectively created on the wiring boards of the first main winding substrate 14A, the second main winding substrate 14B and the control winding substrate 15.

The first main winding substrate 14A is provided with the winding pattern of the first main winding 12*b*, and also with two openings, into which the inner leg 16*b* and the center leg 16*a* are inserted. The winding pattern is formed to surround the two openings.

The second main winding substrate 14B is provided with the winding pattern of the second main winding 12*c*, and also with two openings, into which the inner leg 16*c* and the center leg 16*a* are inserted. The winding pattern is formed to surround the two openings.

The control winding substrate 15 is provided with the winding patterns of the control windings 13*a*, 13*b*, and also with three openings, into which the inner leg 16*b*, the inner leg 16*c* and the center leg 16*a* are inserted. The winding patterns are formed to surround the openings for inserting the inner leg 16*b* and the inner leg 16*c* among the three openings.

The first main winding 12*b* and the second main winding 12*c* are supplied with high-frequency currents brunched from a high-frequency power source, not shown, so as to generate AC magnetic fluxes flowing around each leg, namely the center leg 16*a*, the inner legs 16*b*, 16*c*, and the outer legs 16*d*, 16*e*, of the planer core 11. On the other hand, the control windings 13*a*, 13*b* are supplied with direct currents to generate a DC magnetic fluxes flowing around each leg, namely the center leg 16*a*, the inner legs 16*b*, 16*c*, and the outer legs 16*d*, 16*e*, of the planer core 11.

FIG. 5 shows a state of currents flowing the winding of each wiring board and states of fluxes induced by the current. FIG. 5(*a*) shows a schematic configuration of the planer core 11 of the reactor 10 that is the same as that of FIG. 1(*a*). FIG. 5(*b*) shows the states of the currents and the states of the magnetic fluxes of the first main winding substrate 14A, the second main winding substrate 14B and the control winding substrate 15.

In FIG. 5, with respect to the direction of each current flow, the direction of the current flowing forward in the figure is indicated by a circle with an inner black circle (•), while the direction of the current flowing backward in the figure is indicated by a circle with an inner cross (x) mark, and with respect to the magnetic flux directions, the direction of the magnetic flux flowing forward in the figure is indicated by a square with an inner black circle (•), while the direction of the magnetic flux flowing backward in the figure is indicated by a square with an inner cross (x) mark.

• State of a magnetic flux generated by the main winding:

In the first main winding substrate 14A, the high-frequency current flowing the main winding 12*b* generates magnetic fluxes around the outer leg 16*d*, the inner leg 16*b*, the center 16*a* and the inner leg 16*c*. In the second main winding substrate 14B, the high-frequency current flowing the main winding 12*c* generates magnetic fluxes around the inner leg 16*b*, the center leg 16*a*, the inner leg 16*c* and the outer leg 16*e*.

When the high-frequency current of the main winding 12*b* flows in the direction shown by an arrow, a magnetic flux in the direction shown in the figure is generated around each leg. Around the inner leg 16*b*, a magnetic flux that flows in the backward magnetic flux direction in the figure is generated by the high-frequency current flowing the main winding 12*b*, a magnetic flux that flows in the forward magnetic flux direction in the figure is generated by the high-frequency current flowing the main winding 12*c*. As two fluxes generated around the inner leg 16*b* flow in the directions opposite to each other, both fluxes are cancelled out each other when the number of turns and the current value of the main winding 12*b* and the main winding 12*c* are equal. Similarly, a magnetic flux that flows in the forward magnetic flux direction in the figure and another magnetic flux that flows in the backward magnetic flux direction backward in the figure are generated around the inner leg 16*c* respectively by the high-frequency current flowing the main winding 12*b* and the high-frequency current flowing the main winding 12*c*. Since the two magnetic fluxes generated around the inner leg 16*c* flow in the directions opposite to each other, both magnetic fluxes are cancelled out each other when the number of turns and the current value of the main winding 12*b* and the main winding 12*c* are equal.

Furthermore, around the center leg 16*a*, a magnetic flux flowing in the backward magnetic flux direction in the figure is generated by the high-frequency current flowing the main winding 12*b*, and also another magnetic flux flowing in the backward magnetic flux direction in the figure is generated by the high-frequency current flowing the main winding 12*c*.

FIG. 5(*c*) shows the states of magnetic fluxes generated by high-frequency currents, in which the magnetic fluxes generated around the inner leg 16*b* and the inner leg 16*c* by the high-frequency currents are cancelled out each other.

• State of a magnetic flux generated by the control winding:

On the control winding substrate 15, a direct current flowing through the control winding 13*a* generates magnetic fluxes around the outer leg 16*d*, the inner leg 16*b* and the center leg 16*a*, and a direct current flowing the control winding 13*b* generates magnetic fluxes around the center leg 16*a*, the inner leg 16*c* and the outer leg 16*e*. In FIG. 5, when the direct currents of the control windings 13*a*, 13*b* flow in the direction indicated with arrows, respectively, a magnetic flux flowing in the direction shown in the figure is generated around each leg.

Around the inner leg 16*b* and the inner leg 16*c*, magnetic fluxes flowing in the backward magnetic flux direction in the figure are generated by the direct currents respectively flowing the control windings 13*a*, 13*b*. Since the AC magnetic fluxes generated by the high-frequency current around the inner leg 16*b* and the inner leg 16*c* are cancelled out each other, no current is induced by the AC magnetic flux in the control windings 13*a*, 13*b*, thereby preventing the flow of the high-frequency current and the generation of an excessive voltage in the control circuit, not shown.

FIG. 5(*d*) shows a state of a magnetic flux generated by a direct current, in which a state of a DC magnetic flux with a uniform flux density is generated around all the legs of the core, including the inner legs 16*b*, 16*c* and the center leg 16*a*, by the direct current.

Thus, in the configuration of the first embodiment, the wiring boards are incorporated in layers into the planer core 11, so that the winding patterns of the first main winding 12*b* and the second main winding 12*c* surround together the center 16*a*. In addition to that, in the inner leg 16*b*, the magnetic fields generated by the main winding currents flowing through the first main winding 12*b* and the second main winding 12*c* are in the opposing directions, and thereby the magnetic fluxes are cancelled out each other. Correspondingly, in the inner leg 16*c*, the magnetic fields generated by the main winding currents flowing the first main winding 12*b* and the second main winding 12*c* are in the opposing directions, and thereby the magnetic fluxes are cancelled out each other.

FIG. 6 schematically shows a state of a magnetic flux around each legs of the planer core, FIGS. 6(*a*) and 6(*b*) respectively showing states of magnetic fluxes generated by the first main winding and the second main winding, FIG. 6(*c*) showing a state in which the magnetic fluxes generated by the two main windings are combined, FIG. 6(*d*) showing a state of a magnetic flux generated by the control winding, FIG. 6(*e*) showing a state in which the magnetic fluxes generated by the two main windings and the control winding are combined.

The magnetic flux generated by the first main winding flows, as shown in FIG. 6(*a*), through a path around the outer leg 16*d* and the inner leg 16*b* and also through a path around the center leg 16*a* and the inner leg 16*c*, and the magnetic flux generated by the second main winding flows, as shown in FIG. 6(*b*), through a path around the inner leg 16*b* and the center leg 16*a* and also through a path around the inner leg 16*c* and the outer leg 16*e*. In the inner legs 16*b*, 16*c*, AC magnetic fluxes generated by the two main windings cancel each other out. An arrow shown by a broken line in FIG. 6(*c*) presents a cancellation state.

A DC magnetic flux generated by the control winding flows, as shown in FIG. 6(*d*), through the inner leg 16*b* and the inner leg 16*c*, between which the AC magnetic fluxes are cancelled out, so that a uniform magnetic flux density is formed in the center leg 16*a* and the outer legs 16*d*, 16*e*.

Second Embodiment of Reactor

A second embodiment of the reactor has the same configuration as that of the first embodiment, except the configuration of the main winding substrate, to thereby bringing the magnetic fluxes into the state similar to that of the first embodiment. With reference to FIGS. 7 to 9, the second embodiment of the reactor of the present invention will be described. FIG. 7 schematically shows the second embodiment of the reactor of the invention. In this figure, the same reference signs are assigned to the parts in common with those in FIG. 1 and FIGS. 4 to 6.

FIG. 7(*a*) shows a schematic configuration of the planer core 11 of the reactor 10. The planer core 11 has the configuration similar to that shown in FIG. 4(*a*), which configuration has the center leg 16*a*, the pair of the inner legs 16*b*, 16*c* arranged on both sides of the center leg 16*a*, and further has the pair of the outer legs 16*d*, 16*e* disposed outside the inner legs 16*b*, 16*c*. The adjacent legs are provided with through holes between them, into which the wiring boards of the first main winding substrate 14A, the second main winding substrate 14B and the control winding substrate 15 are respectively placed.

FIG. 7(*b*) shows the wiring boards of the first main winding substrate 14A, the second main winding substrate 14B and the control winding substrate 15, and FIG. 7(*c*) shows the winding patterns formed on the wiring boards of the first main winding substrate 14A, the second main winding substrate 14B and the control winding substrate 15, respectively.

On the first main winding substrate 14A, the winding pattern of the first main winding 12*b* is formed, and three openings are provided to insert the inner legs 16*b*, 16*c* and the center leg 16*a* therein. The winding pattern is formed to surround these three openings.

On the second main winding substrate 14B, the winding pattern of the second main winding 12*c* is formed, and an opening is provided to insert the center leg 16*a* therein. The winding pattern is formed to surround this opening.

On the control winding substrate 15, the winding patterns of the control windings 13*a*, 13*b* are formed, and three openings are provided to insert therein the inner leg 16*b* and inner leg 16*c* as well as the center leg 16*a*. The winding patterns are formed to surround the opening among three openings into where the inner leg 16*b* and the inner leg 16*c* are inserted. The configuration of the control winding substrate 15 is the same as that in the first embodiment.

The first main winding 12*b* and the second main winding 12*c* are supplied with high-frequency currents branched from a high-frequency power source, not shown, so as to generate AC magnetic fluxes flowing through each leg, namely the center leg 16*a*, the inner legs 16*b*, 16*c* and the outer legs 16*d*, 16*e*, of the planer core 11. On the other hand, the control windings 13*a*, 13*b* are supplied with the direct current to thereby generate DC magnetic fluxes with the same magnetic flux density around all the legs of the planer core 11, including the center leg 16*a* and the inner legs 16*b*, 16*c*.

FIG. 8 shows a state of current flowing the winding of each wiring board and a state of a magnetic flux induced by the current. FIG. 8 (*a*) shows a schematic configuration of the planer core 11 of the reactor 10 that is the same as that of FIG. 7 (*a*). FIG. 8 (*b*) shows the states of the currents and the states of the magnetic fluxes of the first main winding substrate 14A, the second main winding substrate 14B and the control winding substrate 15.

FIG. 8 also uses the same symbols as those in the first embodiment which denote the direction of the current and the direction of the magnetic flux.

• State of a magnetic flux generated by the main winding:

On the first main winding substrate 14A, fluxes are generated around the outer leg 16*d*, the inner leg 16*b*, the inner leg 16*c* and the outer 16*e* by a high-frequency current flowing the main winding 12*b*, and in the second main winding substrate 14B, fluxes are generated around the inner leg 16*b*, center leg 16*a* and the inner leg 16*c* by a high-frequency current flowing the main winding 12*c*.

When the high-frequency current of the main winding 12*b* flows in the direction indicated by an arrow, a magnetic flux flowing in the direction shown in the figure is generated around each leg. Around the inner leg 16*b*, a magnetic flux flowing in the backward magnetic flux direction in the figure is generated by the high-frequency current flowing through the main winding 12*b*, and another magnetic flux flowing in the forward magnetic flux direction in the figure is also generated by the high-frequency current flowing in the main winding 12*c*. Since these two magnetic fluxes generated around the inner leg 16*b* flow in the directions opposite to each other, both magnetic fluxes are cancelled out each other if the number of turns and the current value of the main winding 12*b* and the main winding 12*c* are equal. Correspondingly, around the inner leg 16*c*, a magnetic flux flowing in the backward magnetic flux direction in the figure is generated by the high-frequency current flowing the main winding 12*b*, and another flux flowing in the forward magnetic flux direction in the figure is also generated by the high-frequency current flowing in the main winding 12*c*. Since these two magnetic fluxes generated around the inner leg 16*c* flow in the directions opposite to each other, both magnetic fluxes cancel each other out if the number of turns and the current value of the main winding 12*b* and the main winding 12*c* are equal.

In addition to that, around the center leg 16*a*, a magnetic flux flowing in the backward magnetic flux direction in the figure is generated by the high-frequency current flowing the main winding 12*c*.

FIG. 8(*c*) shows a state of a magnetic flux generated by a high-frequency current, in which state the magnetic fluxes generated by the high-frequency current around the inner leg 16*b* and the inner leg 16*c* are cancelled out each other.

• State of a magnetic flux generated by the control winding:

On the control winding substrate 15, magnetic fluxes are generated around the outer leg 16*d*, the inner leg 16*b* and the center leg 16*a* by a direct current flowing in the control winding 13*a*, and also magnetic fluxes are generated around the center leg 16*a*, the inner leg 16*c* and the outer leg 16*e* by a direct current flowing the control winding 13*b*. The states of the magnetic fluxes generated by the control windings in the second embodiment are similar to the states of the magnetic fluxes generated by the control windings in the first embodiment. In FIG. 8, when the direct currents of the control windings 13*a*, 13*b* flow in the direction indicated by arrows, a magnetic flux flowing in the direction shown in the figure is generated around each leg.

Around the inner leg 16*b* and the inner leg 16*c*, magnetic fluxes flowing in the backward magnetic flux direction in the figure are generated by the direct currents flowing the control windings 13*a*, 13*b*. Since the AC magnetic fluxes generated by the high-frequency currents around the inner leg 16*b* and the inner leg 16*c* are cancelled out each other, no current is induced by the AC magnetic fluxes in the control windings 13*a*, 13*b*, thereby preventing the flow of the high-frequency current and the generation of an excessive voltage in the control circuit, not shown.

FIG. 8(*d*) shows a state of a magnetic flux generated by a direct current, in which a state of a DC magnetic flux with a uniform flux density is generated around all the legs, including the inner legs 16*b*, 16*c* and the center leg 16*a*, by the direct current.

Thus, in the configuration of the second embodiment, the wiring boards are incorporated in layers into the planer core 11, so that the magnetic fields generated in the inner leg 16*b* by the main winding currents flowing through the first main winding 12*b* and the second main winding 12*c* are in the opposing directions, and thereby the magnetic fluxes cancel each other out. Correspondingly, in the inner leg 16*c*, the magnetic fields generated by the main winding currents flowing through the first main winding 12*b* and the second main winding 12*c* are in the opposing directions, and thereby the magnetic fluxes cancel each other out.

FIG. 9 schematically shows a state of a magnetic flux around each leg of the planer core, in which FIGS. 9(*a*) and 9(*b*) respectively show the states of the magnetic fluxes generated by the first main winding and the second main winding, FIG. 9(*c*) shows a state where the magnetic fluxes generated by the two main windings are combined, FIG. 9(*d*) shows a state of a magnetic flux generated by the control winding, and FIG. 9(*e*) shows a state where the magnetic fluxes generated by the two main windings and the control winding are combined.

The magnetic flux generated by the first main winding flows, as shown in FIG. 9(*a*), through a path around the outer leg 16*d* and the inner leg 16*b* and also through a path around the inner leg 16*c* and the outer leg 16*e*, and the magnetic flux generated by the second main winding flows, as shown in FIG. 9(*b*), through a path around the inner leg 16*b* and the center leg 16*a* and also through a path around the center leg 16*a* and the inner leg 16*c*. In the inner legs 16*b*, 16*c*, the AC magnetic fluxes generated by the two main windings cancel each other out. Arrows shown in FIG. 9(*c*) by broken lines present cancellation state.

The DC magnetic flux generated by the control winding flows, as shown in FIG. 9(*d*), around the inner leg 16*b* and the inner leg 16*c*, between which the AC magnetic fluxes have been cancelled out, so that a magnetic flux with a uniform flux density is generated around each of the center leg 16*a* and the outer legs 16*d*, 16*e*.

(Winding Pattern of Control Winding)

The winding pattern of the control winding may have a configuration different from those presented in the first embodiment and the second embodiment.

FIG. 10(*a*) shows the winding patterns of the control windings presented in the first and second embodiments. These winding patterns are formed in such a way that the winding is coiled around the inner leg 16*b* the number of predetermined times in the clockwise direction in the figure, and is then coiled around the inner leg 16*c* the number of predetermined times in the clockwise direction in the figure.

FIG. 10(*b*) shows another configuration of the winding pattern of the control winding. This winding pattern is formed in such a way that the winding is coiled around the inner leg 16*b* once in the clockwise direction in the figure, and is further coiled around the inner leg 16*c* once in the clockwise direction in the figure, and then goes back to the inner leg 16*b* to be coiled once around the inner legs 16*b* and 16*c*. This winding pattern of coiling the winding around two inner legs is repeated the number of the predetermined times.

In either case of the winding pattern in FIG. 10(*a*) and the winding pattern in FIG. 10(*b*), the equivalent magnetic fluxes can be generated around all the legs.

The descriptions about the above embodiments and its variations present some examples of the reactor according to the present invention. The invention is therefore not limited to the above embodiments, and can be changed in various ways based on the purport of the invention which will not be excluded from the scope of the invention.

INDUSTRIAL APPLICABILITY

The reactor of the present invention is applicable to an impedance matching device and similar.

REFERENCE SIGNS LIST

10 Reactor
11, 11*a*, 11*b* Planer Core

12*b*, 12*c* Main Winding
13*a*, 13*b* Control Winding
14A First Main Winding Substrate
14B Second Main Winding Substrate
15 Control Winding Substrate
16*a* Center Leg
16*b*, 16*c* Inner Leg
16*d*, 16*e* Outer Leg
100 Variable Reactor
101*a*, 101*b* Core
102*a*, 102*b* Main Winding
103 Control Winding
110 Planer Transmitter
111 Planer EE-Core
111*a*, 111*b* E-core
112 Planer UU-Core
112*a*, 112*b*, 112*c*, 112*d* U-Core
121 Planer Core
121*a* Center Leg
121*b*, 121*c* Side Leg
122 Main Winding
123 Control Winding
124 Main Winding Substrate
125 Control Winding Substrate
126*a*, 126*b*, 126*c* Opening

The invention claimed is:

1. A reactor, comprising:

a main winding substrate forming a main winding, a control winding substrate forming a control winding and a planer core, wherein the main winding substrate and the control winding substrate are incorporated in layers into the planer core, the planer core has a center leg, a pair of inner legs arranged on both sides of the center leg, and a pair of outer legs arranged outside the inner legs, in which a main winding current of high-frequency current flowing through the main winding generates an AC magnetic flux around each of the pair of inner legs, the magnetic fluxes having a magnetic field in a direction opposite to each other so as to cancel each other out, a control current of a direct current flowing through the control winding generates a DC magnetic flux with a uniform magnetic flux density around all the legs of the core, and wherein, the main winding substrate consists of a first main winding substrate and a second main winding substrate to hold the control winding substrate from above and below thereof, a main winding of the first main winding substrate is formed to surround the center leg and a first inner leg, which is one of the pair of the inner leg, together, a main winding of the second main winding substrate is formed to surround the center leg and a second inner leg, which is the other of the pair of the inner legs, together, and a control winding of the control winding substrate is formed to surround each of the pair of the first inner leg and the second inner leg individually.

2. The reactor according to claim 1, wherein the direction of the magnetic field of the magnetic flux of center leg is opposite to the direction of the magnetic field of the magnetic flux of the inner leg.

3. The reactor according to claim 2, wherein the control current becomes a variable inductance by a variable current.

4. The reactor according to claim 2, wherein the control current becomes a fixed inductance by a fixed current.

5. The reactor according to claim 2, wherein the planer core has a configuration that an EE-core or UU-core formed by arranging E-cores or U-cores with respective protruding portions facing each other is disposed laterally, or a configuration that an EI-core or UI-core formed by arranging an I-core on the protruding portions of the E-core or U-core is disposed laterally.

6. The reactor according to claim 1, wherein the control current becomes a variable inductance by a variable current.

7. The reactor according to claim 6, wherein the planer core has a configuration that an EE-core or UU-core formed by arranging E-cores or U-cores with respective protruding portions facing each other is disposed laterally, or a configuration that an EI-core or UI-core formed by arranging an I-core on the protruding portions of the E-core or U-core is disposed laterally.

8. The reactor according to claim 1, wherein the control current becomes a fixed inductance by a fixed current.

9. The reactor according to claim 8, wherein the planer core has a configuration that an EE-core or UU-core formed by arranging E-cores or U-cores with respective protruding portions facing each other is disposed laterally, or a configuration that an EI-core or UI-core formed by arranging an I-core on the protruding portions of the E-core or U-core is disposed laterally.

10. The reactor according to claim 1, wherein the planer core has a configuration that an EE-core or UU-core formed by arranging E-cores or U-cores with respective protruding portions facing each other is disposed laterally, or a configuration that an EI-core or UI-core formed by arranging an I-core on the protruding portions of the E-core or U-core is disposed laterally.

11. A reactor, comprising:

a main winding substrate forming a main winding, a control winding substrate forming a control winding and a planer core, wherein the main winding substrate and the control winding substrate are incorporated in layers into the planer core, the planer core has a center les, a pair of inner legs arranged on both sides of the center leg, and a pair of outer legs arranged outside the inner legs, in which a main winding current of high-frequency current flowing through the main winding generates an AC magnetic flux around each of the pair of inner legs, the magnetic fluxes having a magnetic field in a direction opposite to each other so as to cancel each other out, a control current of a direct current flowing through the control winding generates a DC magnetic flux with a uniform magnetic flux density around all the legs of the core, wherein the main winding substrate consists of a first main winding substrate and a second main winding substrate to hold the control winding substrate from above and below thereof, a main winding of the first main winding substrate is formed to surround the center leg and the pair of the inner legs together, a main winding of the second main winding substrate is formed to surround the center leg, and a control winding of the control winding substrate is formed to surround each of the pair of the inner legs individually.

12. The reactor according to claim 11, wherein the direction of the magnetic field of the magnetic flux of center leg is opposite to the direction of the magnetic field of the magnetic flux of the inner leg.

13. The reactor according to claim 11, wherein the control current becomes a variable inductance by a variable current.

14. The reactor according to claim 11, wherein the control current becomes a fixed inductance by a fixed current.

15. The reactor according to claim 11, wherein the planer core has a configuration that an EE-core or UU-core formed by arranging E-cores or U-cores with respective protruding portions facing each other is disposed laterally, or a configuration that an EI-core or UI-core formed by arranging an I-core on the protruding portions of the E-core or U-core is disposed laterally.

* * * * *